United States Patent

Ohashi et al.

[11] Patent Number: 5,205,192
[45] Date of Patent: Apr. 27, 1993

[54] FAIL-SAFE SOLENOID VALVE APPARATUS FOR CONTROLLING OIL PRESSURE FOR VEHICULAR AUTOMATIC TRANSMISSION

[75] Inventors: Tatsuyuki Ohashi, Minami-Kawachimamachi; Tetsuya Mochizuki, Utsunomiya, both of Japan

[73] Assignee: Honda Giken Kogyo Kabushiki Kaisha, Tokyo, Japan

[21] Appl. No.: 889,402

[22] Filed: May 28, 1992

[30] Foreign Application Priority Data

Jul. 31, 1991 [JP] Japan .................. 3-192300

[51] Int. Cl.[5] .......................................... F16H 59/24
[52] U.S. Cl. ................................. 74/867; 74/868
[58] Field of Search ................. 74/867, 868, 869; 137/487.5; 251/26

[56] References Cited

U.S. PATENT DOCUMENTS

| | | | |
|---|---|---|---|
| 4,567,791 | 2/1986 | Sato | 74/867 X |
| 4,625,589 | 12/1986 | Nishikawa et al. | 74/867 X |
| 4,628,771 | 12/1986 | Person et al. | 74/868 X |
| 4,691,597 | 9/1987 | Leorat et al. | 74/867 X |
| 4,843,917 | 7/1989 | Van Selous et al. | 74/868 |
| 4,942,787 | 7/1990 | Aoki et al. | 74/867 |
| 4,957,015 | 9/1990 | Ishikawa et al. | 74/867 X |
| 5,012,699 | 5/1991 | Aoki et al. | 74/869 |

FOREIGN PATENT DOCUMENTS 62-255645 11/1987 Japan.

Primary Examiner—Richard M. Lorence
Assistant Examiner—Khoi Q. Ta
Attorney, Agent, or Firm—Armstrong, Westerman, Hattori, McLeland & Naughton

[57] ABSTRACT

An apparatus for controlling an oil pressure for a vehicular automatic transmission has an accumulator connected to an oil passage which is in communication with each of clutches for transmission or speed changing; a regulator valve for regulating an oil pressure to be supplied to the hydraulic clutches; a first pressure control valve of electromagnetic type for controlling an output oil pressure of the regulator valve by causing an oil pressure to act thereupon; and a second pressure control valve of electromagnetic type for controlling a back pressure of the accumulator. A drain port of one of the first and second pressure control valves is connected to an oil passage on an output side of the other of the pressure control valves.

4 Claims, 3 Drawing Sheets

FAIL-SAFE SOLENOID VALVE APPARATUS FOR CONTROLLING OIL PRESSURE FOR VEHICULAR AUTOMATIC TRANSMISSION

BACKGROUND OF THE INVENTION

This invention relates to an apparatus for controlling an oil pressure for a vehicular automatic transmission.

As this kind of conventional apparatus, Japanese Published Unexamined Patent Application No. 255645/1987 discloses an apparatus which comprises: accumulators connected to oil passages which are communicated with hydraulic engaging elements for transmission or speed changing; a regulator valve for regulating the oil pressure to be supplied to the hydraulic engaging elements; a first pressure control valve of electromagnetic type for controlling the output oil pressure of the regulator valve by causing the oil pressure to act thereupon; a second pressure control valve of electromagnetic type for controlling the back pressure of the accumulators; wherein at the time of transmission, or speed change operation, the output oil pressure of the regulator valve and the back pressure of the accumulators are varied by an electronic control circuit via both pressure control valves, whereby shocks at the time of speed changing are absorbed or alleviated.

In the above-described apparatus, if the pressure control valve is locked, due to a failure in the solenoid thereof, sticking of the spool, or the like, into a condition in which a drain port thereof is opened whereby the output oil pressure is lowered, the oil pressure to be controlled by this pressure control valve will also be kept maintained in a low pressure. As a consequence, an adequate control can no longer be effected.

OBJECT AND SUMMARY OF THE INVENTION

This invention has an object of providing an apparatus for controlling an oil pressure for a vehicular automatic transmission, in which apparatus, even if one of the first and the second pressure control valves becomes out of order, an appropriate control can be effected provided that the other is in good order.

In order to attain the above-described object, this invention provides an apparatus for controlling an oil pressure for a vehicular automatic transmission, the apparatus comprising: an accumulator connected to an oil passage which is in communication with each of hydraulic engaging elements for transmission or speed changing; a regulator valve for regulating an oil pressure to be supplied to the hydraulic engaging elements; a first pressure control valve of electromagnetic type for controlling an output oil pressure of the regulator valve by causing an oil pressure to act thereupon; a second pressure control valve of electromagnetic type for controlling a back pressure of the accumulator; wherein a drain port of one of the first and second pressure control valves is connected to an oil passage on an output side of the other of the pressure control valves.

Even if one of the pressure control valves is locked into a condition in which the drain port is open, the output oil pressure of the other of the pressure control valves is output via the drain port of the above-described one pressure control valve to the output side oil passage of the above-described one pressure control valve, provided that the other pressure control valve is in good order. A fail-safe function can thus be secured or obtained.

If the second pressure control valve is out of order, so that the back pressure of the accumulator becomes low, the consequence will only be that the shock at the time of transmission or speed changing is affected to a certain degree. However, if the first pressure control valve is out of order, so that the output oil pressure of the regulator valve becomes low, slippage occurs in the hydraulic engaging elements due to lack in the engaging force, with the result that the engaging elements will give rise to wear. Therefore, it is desirable to define the first pressure control valve as the above-described one pressure control valve, so that no slippage occurs in the hydraulic engaging elements due to the failure in the first pressure control valve.

If both pressure control valves are in good order, there is a possibility that the output oil pressure of one of the pressure control valves goes wrong under the influence of the output oil pressure of the other of the pressure control valves, the output oil pressure of the other pressure control valve being input through the drain port of the above-described one pressure control valve. However, this kind of disadvantage will not happen if the output oil pressure of the above-described other pressure control valve is arranged to be equal to or below the output oil pressure of the above-described one pressure control valve. In this case, when the output oil pressure of the above-described one pressure control valve is high, its drain port is closed and, therefore, the output oil pressure thereof does not affect the output oil pressure of the above-described other pressure control valve.

In a preferred embodiment hereinbelow described, it is a regulator valve 14 that corresponds to the regulator valve in the foregoing explanation.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF A PREFERRED EMBODIMENT

Figure 1:
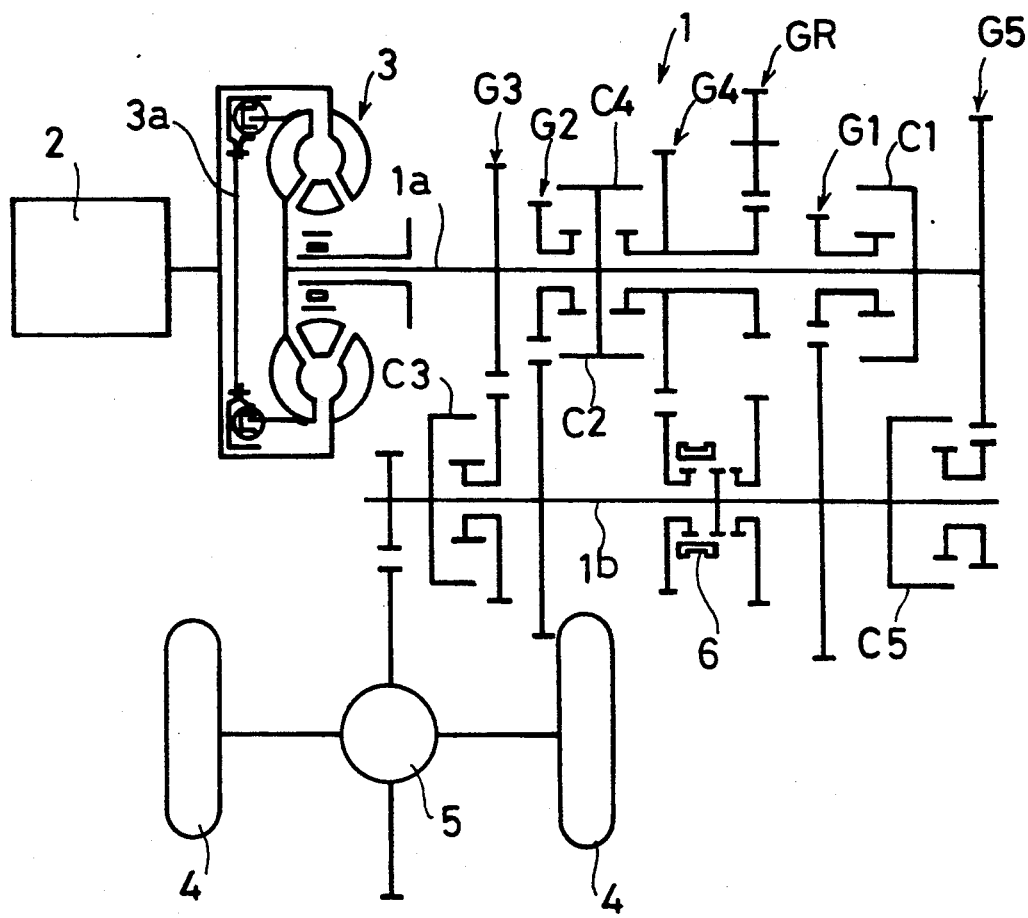
FIG. 1 is a diagram of one example of a transmission to which this invention is applied.

Referring to FIG. 1, numeral 1 denotes a transmission for effecting the changing or shifting of a vehicle speed to five forward speeds and one reverse speed. The transmission 1 comprises: an input shaft 1a which is connected to an engine 2 via a fluid torque converter 3; an output shaft 1b which is connected to driving wheels 4 of the vehicle via a differential gear 5; and first- to fifth-speed forward transmission trains G1, G2, G3, G4, G5 and one reverse transmission train GR, all transmission trains being disposed between the input shaft 1a and the output shaft 1b. In each of the forward transmission trains, there is interposed hydraulic engaging means in the form of a hydraulic clutch C1, C2, C3, C4, C5 respectively so that, through the engagement of each hydraulic clutch, each of the transmission trains can be selectively established. The reverse transmission train GR is arranged to use the fourth-speed clutch C4 in common with the fourth-speed transmission train G4. The fourth-speed transmission train G4 or the reverse transmission train GR is selectively established by changing over a selector gear 6 to the forward position in the left-hand side in FIG. 1 and the reverse position in the right-hand side thereof.

Figure 2:
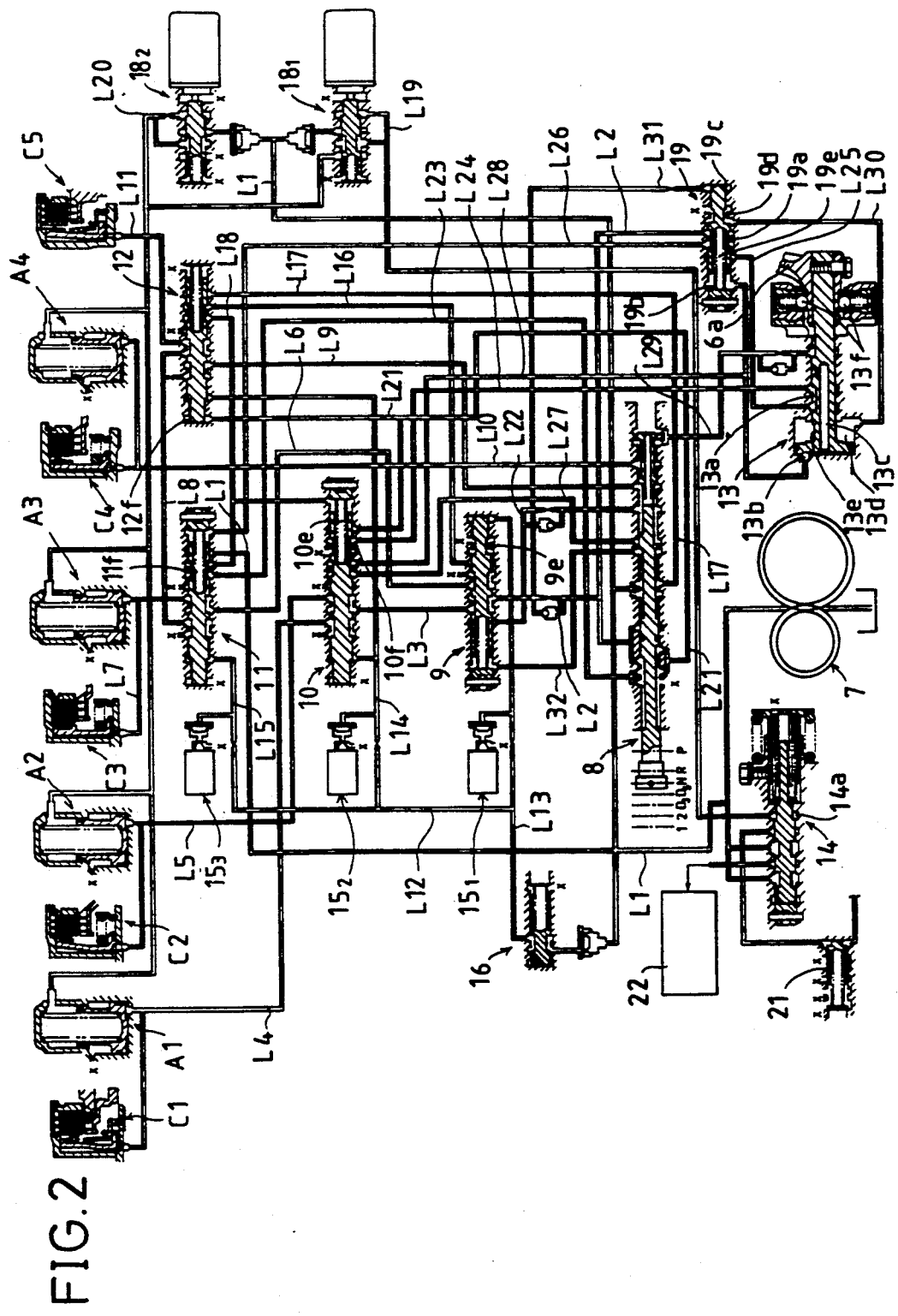
FIG. 2 is a hydraulic oil circuit diagram of one embodiment of this invention apparatus.
Figure 3:
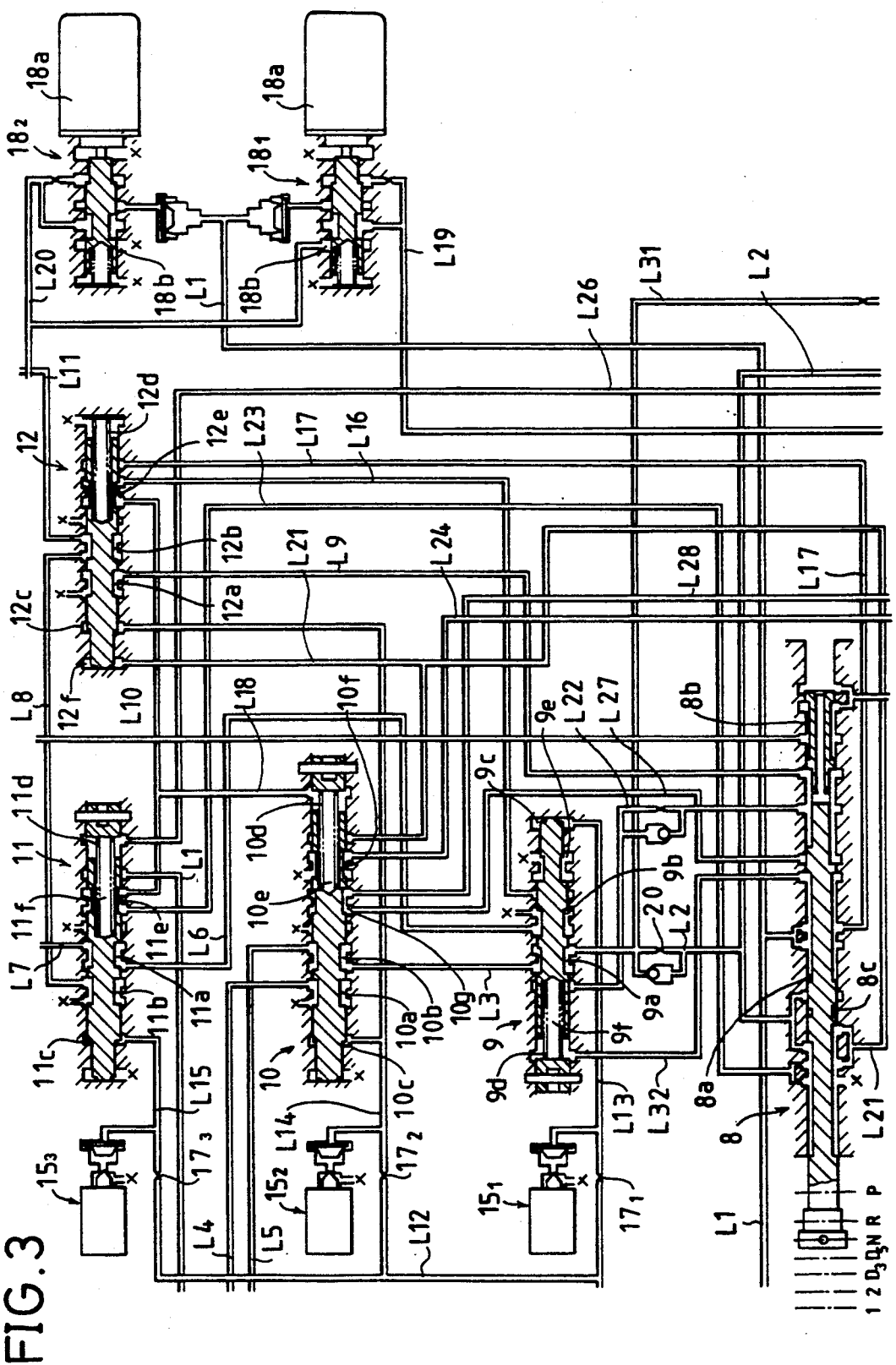
FIG. 3 is an enlarged diagram of an important portion of the hydraulic circuit shown in FIG. 2.

The supply and discharge of hydraulic oil to and from each of the hydraulic clutches C1, C2, C3, C4, C5 are controlled by the hydraulic oil circuit shown in FIG. 2. This will now be described in more detail. The hydraulic oil circuit comprises: a hydraulic power source 7; a manual valve 8 which can be changed over among a total of seven positions, i.e., a parking position P, a reverse position R, a neutral position N (the position as illustrated), an automatic transmission or speed change position $D_5$ for changing the speed among first-speed through fifth-speed, an automatic speed change position $D_3$ for changing the speed among first-speed through third-speed, a second-speed hold position 2 and a first-speed hold position 1; a main shift valve 9 for selecting a low-speed system consisting of the first-speed transmission train G1 and the second-speed transmission train G2 and a high-speed system consisting of the third-speed transmission train G3, the fourth-speed transmission train G4 and the fifth-speed transmission train G5; a 1-2 shift valve 10 which is connected to the downstream of the main shift valve 9; a 3-4 shift valve 11 which is connected to the downstream of the main shift valve 9 in parallel with the 1-2 shift valve 10; a 4-5 shift valve 12 which is connected to the downstream of the 3-4 shift valve 11; and a servo valve 13 which is for changing over between forward transmission and reverse transmission and is connected with a fork 6a to be engaged with the selector gear 6. These valves are shown in detail in FIG. 3.

When the manual valve 8 is in the $D_5$ range, No. 1 oil passage L1 which is connected to the hydraulic power source 7 is connected via an annular groove 8a of the manual valve 8 to No. 2 oil passage L2 which is communicated with the main shift valve 9. The oil which is adjusted by a regulator valve 14 to a predetermined line pressure is thus supplied from No. 1 oil passage L1 to No. 2 oil passage L2. When the main shift valve 9 is changed over to the low-speed position (the position as illustrated) in which the low-speed system is selected, No. 2 oil passage L2 is connected via an annular groove 9a of the main shift valve 9 to No. 3 oil passage L3 which is communicated with the 1-2 shift valve 10. When the 1-2 shift valve 10 is changed over to the right-hand first-speed position, which is the downshift position, No. 3 oil passage L3 is connected via an annular groove 10a of the shift valve 10 to No. 4 oil passage L4 which is communicated with the first-speed hydraulic clutch C1, with the result that the first-speed transmission train G1 is established. When the 1-2 shift valve 10 is changed over to the left-hand second-speed position (the position as illustrated), No. 3 oil passage L3 is connected via an annular groove 10b of the 1-2 shift valve 10 to No. 5 oil passage L5 which is communicated with the second-speed hydraulic clutch C2, with the result that the second-speed transmission train G2 is established. When the main shift valve 9 is changed over to the left-hand high-speed position in which the high-speed system is selected, No. 2 oil passage L2 is connected via an annular groove 9b of the main shift valve 9 to No. 6 oil passage L6 which is communicated with the 3-4 shift valve 11. When the 3-4 shift valve 11 is changed over to the left-hand third-speed position, which is the downshift position (the position as illustrated), No. 6 oil passage L6 is connected via an annular groove 11a of the 3-4 shift valve 11 to No. 7 oil passage L7 which is communicated with the third-speed hydraulic clutch C3, with the result that the third-speed transmission train G3 is established. When the 3-4 shift valve 11 is changed over to the right-hand fourth-speed position, which is the upshift position, No. 6 oil passage L6 is connected via an annular groove 11b of the 3-4 shift valve 11 to No. 8 oil passage L8 which is communicated with the 4-5 shift valve 12. When the 4-5 shift valve 12 is changed over to the right-side fourth-speed position, which is downshift position, No. 8 oil passage L8 is connected via an annular groove 12a of the 4-5 shift valve 12 to No. 9 oil passage L9. In the $D_5$ range of the manual valve 8, the oil is supplied to the fourth-speed hydraulic clutch C4 through No. 10 oil passage L10 which is connected to No. 9 oil passage L9 via an annular groove 8b of the manual valve 8, with the result that the fourth-speed transmission train G4 is established. When the 4-5 shift valve 12 is changed over to the left-hand fifth-speed position (the position as illustrated), which is the upshift position, No. 8 oil passage L8 is connected via an annular groove 12b of the 4-5 shift valve 12 to No. 11 oil passage L11 which is communicated with the fifth-speed hydraulic clutch C5, with the result that the fifth-speed transmission train G5 is established.

The main shift valve 9, the 1-2 shift valve 10 and the 3-4 shift valve 11 are shift-controlled by No. 1 through No. 3 solenoid valves $15_1$, $15_2$, $15_3$, respectively, which are opened and closed by a non-illustrated electronic control circuit. This will now be described in more detail. A modulator pressure (i.e., a predetermined pressure which is lower than the line pressure) from a modulator valve 16 which is connected to No. 1 oil passage L1 is arranged to be input: to a right-side oil chamber 9c of the main shift valve 9 through No. 13 passage L13 which is connected via an orifice $17_1$ to No. 12 oil passage L12 on the output side of the modulator valve 16; to a left-side oil chamber 10c of the 1-2 shift valve 10 through No. 14 oil passage L14 which is connected via another orifice $17_2$ to No. 12 oil passage L12; and to a left-side oil chamber 11c of the 3-4 shift valve 11 through No. 15 oil passage L15 which is connected via still another orifice $17_3$ to No. 12 oil passage L12. To each of these No. 13 through No. 15 oil passages there are connected No. 1 through No. 3 normally-closed type solenoid valves $15_1$, $15_2$, $15_3$ for opening each of the oil passages to atmosphere. In addition, No. 14 oil passage L14 is connected to a left-side oil chamber 12c of the 4-5 shift valve 12. No. 2 solenoid valve $15_2$ is thus made to be a common solenoid valve for changing over both the 1-2 shift valve 10 and the 4-5 shift valve 12. The transmission or speed change operation among the first-speed through the fifth-speed is effected by opening and closing No. 1 through No. 3 solenoid valves $15_1$, $15_2$, $15_3$ in the manner as described below.

Namely, at the first speed, No. 1 solenoid valve $15_1$ is opened and No. 2 solenoid valve $15_2$ is closed. As a result of this operation, the input of the modulator pressure to the oil chamber 9c of the main shift valve 9 is cut off, so that the main shift valve 9 is changed over to the right-hand low-speed position by a spring 9d. At the same time, the 1-2 shift valve 10 is changed over, due to the input of the modulator pressure to the oil chamber 10c, to the right-hand first-speed position against the spring 10d, with the result that the first-speed transmission train G1 is established as described above. When the 3-4 shift valve 11 is in the right-hand fourth-speed position as will be described in detail hereinafter, the line pressure is input from No. 1 oil passage L1 to a right-end oil chamber 10e of the 1-2 shift valve 10 through No. 18 oil passage L18, whereby the 1-2 shift valve 10 is restrained to the left-hand second-speed position. Therefore, at the time of the first speed, No. 3 solenoid valve $15_3$ is opened to change over the 3-4 shift valve 11 to the left-hand third-speed position.

At the second speed, No. 1 solenoid valve $15_1$ is opened and No. 2 solenoid valve $15_2$ is opened. As a result of this operation, the main shift valve 9 is in the low-speed position like in the first speed. On the other hand, the input of the modulator pressure to the oil chamber 10c of the 1-2 shift valve 10 is cut off, so that the 1-2 shift valve 10 is changed over to the left-hand second-speed position by a spring 10d, with the result that the second speed train G2 is established as described above. In this case, No. 3 solenoid valve $15_3$ may be left open or closed.

At the third speed, No. 1 solenoid valve $15_1$ is closed and No. 3 solenoid valve $15_3$ is opened. As a result of this operation, the main shift valve 9 is changed over, due to the input of the modulator pressure to the oil chamber 9c of the main shift valve 9, to the left-hand high-speed position against the spring 9d. At the same time, since the input of the modulator pressure to the oil chamber 11c of the 3-4 shift valve 11 is cut off, the 3-4 shift valve 11 is changed over to the left-hand third-speed position by a spring 11d, with the result that the third-speed transmission train G3 is established as described above. In this case, No. 2 solenoid valve $15_2$ may be left open or closed.

At the fourth speed, No. 1 through No. 3 solenoid valves $15_1$, $15_2$, $15_3$ are all closed. As a result of this operation, the main shift valve 9 is in the high-speed position like at the third speed. On the other hand, the 3-4 shift valve 11 is changed over to the right-hand fourth-speed position. At the same time, the 4-5 shift valve 12 is changed over, due to the input of the modulator pressure to the oil chamber 12c of the 4-5 shift valve 12, to the right-hand fourth-speed position against a spring 12d, with the result that the fourth speed transmission train G4 is established as described above.

At the fifth speed, No. 1 and No. 3 solenoid valves $15_1$, $15_3$ are closed and No. 2 solenoid valve $15_2$ is opened. As a result of this operation, the main shift valve 9 and the 3-4 shift valve 11 are held in the high-speed position and the fourth-speed position, respectively, like at the fourth speed. On the other hand, the input of the modulator pressure to the oil chamber 12c of the 4-5 shift valve 12 is cut off, the 4-5 shift valve 12 is changed over to the left-hand fifth-speed position by the spring 12d, with the result that the fifth-speed transmission train G5 is established.

The above-described combination of No. 1 through No. 3 solenoid valves $15_1$, $15_2$, $15_3$ at each of the transmission trains can be summarized as shown in Table 1. These solenoid valves are opened or closed according to a speed change map which is contained in the electronic control circuit, whereby transmission or speed change operation among the first speed through fifth speed is effected.

TABLE 1

|  | No. 1 solenoid valve | No. 2 solenoid valve | No. 3 solenoid valve |
|---|---|---|---|
| first speed | open | closed | open |
| second speed | open | open | closed or open |
| third speed | closed | open or closed | open |
| fourth speed | closed | closed | closed |
| fifth speed | closed | open | closed |

When the vehicle is running at the fifth speed, No. 2 solenoid valve $15_2$ is open and the 1-2 shift valve 10 is in the second-speed position. Even if the main shift valve 9 is changed over to the low-speed position due to some abnormality or the like during running at the fifth speed, there will occur no downshifting from the fifth speed to the first speed. However, if the main shift valve 9 is changed over to the low-speed position, there exists a possibility of downshifting from the fifth speed to the second speed and from the fourth speed to the first speed. In order to prevent this kind of downshifting, it is so arranged that the main shift valve 9 is hydraulically restrained to the left-hand high-speed position during running at the fourth and fifth speeds. In other words, there is formed a differential pressure groove 9e, which has a difference in area, on the right side of the main shift valve 9. At the high-speed position of the main shift valve 9, the differential pressure groove 9e is isolated from the drain port so as to be connected to No. 16 oil passage L16 which is communicated with the 4-5 shift valve 12. At the $D_5$ range of the manual valve 8, No. 17 oil passage L17, which is connected to No. 1 oil passage L1 via an annular groove 8a of the manual valve 8, is connected to No. 16 oil passage L16 via an annular groove 12e of the 4-5 shift valve 12 at its right-hand fourth-speed position. At the right-hand fourth-speed position of the 3-4 shift valve 11, No. 18 oil passage L18, which is connected to No. 1 oil passage L1 via an annular groove 11e of the 3-4 shift valve 11, is connected to No. 16 oil passage L16 via the annular groove 12e of the 4-5 shift valve 12 at its left-hand fifth-speed position. In this arrangement, at the time of the fourth-speed and the fifth-speed, the line pressure is input to the differential pressure groove 9e through No. 16 oil passage L16, whereby the main shift valve 9 is urged towards the left-hand side due to the differential pressure corresponding to the difference in area between the left end and the right end of the groove 9e, with the result that the main shift valve 9 is restrained to the left-hand high-speed position.

In FIG. 2, numerals A1, A2, A3, A4 denote accumulators which are provided to absorb sudden pressure changes during supplying and discharging of the oil to each of the hydraulic clutches C1, C2, C3, C4. There are provided a first electromagnetic pressure control valve $18_1$ for the line pressure and a second electromagnetic pressure control valve $18_2$ for the back pressure of the accumulators. No. 1 oil passage L1 is connected to the input side of both pressure control valves $18_1$, $18_2$. No. 19 oil passage L19 on the output side of the first pressure control valve $18_1$ is connected to that oil chamber 14a of the regulator valve 14 which operates to increase the pressure, and No. 20 oil passage L20 on the output side of the second pressure control valve $18_2$ is connected to the back pressure chamber of each of the accumulators A1, A2, A3, A4.

Figure 4:
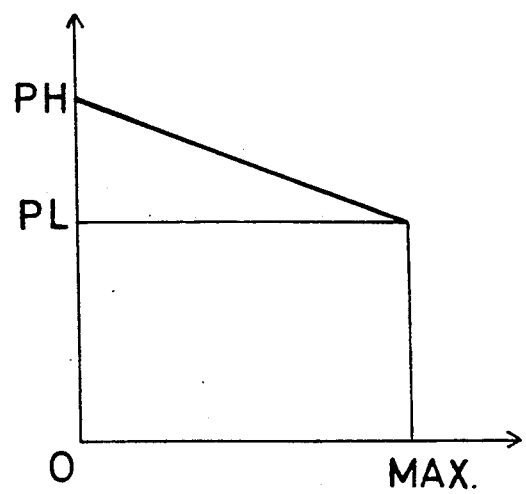
FIG. 4 is a diagram showing the characteristics of control of line pressure by a first pressure control valve.

Each of the pressure control valves $18_1$, $18_2$ is so arranged that the output pressure varies in inverse proportion to the value of the electric current to be charged to each solenoid $18a$. The line pressure varies, as shown in FIG. 4, between a predetermined upper limit pressure PH and a predetermined lower limit pressure PL depending on the value of the electric current to be charged to the solenoid $18a$ of the first pressure control valve $18_1$. During transmission or speed changing, $P_1$ which is defined to be the output pressure of the first pressure control valve $18_1$ and $P_2$ which is defined to be the output pressure of the second pressure control valve $18_2$ are caused to be varied within the conditions of $P_2 \leq P_1$ in accordance with the speed changes or the like of the output shaft of the transmission in order to absorb the speed change shocks. During no speed change operation, both $P_1$ and $P_2$ are normally made to be maximum pressures. During running at above a predetermined vehicle speed at a small throttle opening degree, the engine torque is small and, consequently, the clutch engaging force may also be small; therefore, $P_1$ and $P_2$ are made to be zero.

If the first pressure control valve $18_1$ is locked to a condition in which no oil pressure is output due to some abnormality, such as sticking, the line pressure will become low and slipping of the clutches will occur, thereby influencing the running of the vehicle. Therefore, in the embodiment of this invention, No. 20 oil passage L20 is connected to the drain port $18b$ of the first pressure control valve $18_1$. Thus, even if the first pressure control valve $18_1$ is locked to a condition in which no oil pressure is output (in this condition the drain port $18b$ is communicated with No. 19 oil passage L19), the output pressure $P_2$ from the second pressure control valve $18_2$ is arranged to be input to No. 19 oil passage L19 so as to prevent the dropping of the line pressure. Under normal conditions, the arrangement is made such that $P_2 \leq P_1$ and, therefore, no abnormality occurs to the control of the line pressure due to such an occurrence as the input of $P_2$ to No. 19 oil passage L19. When $P_1$ and $P_2$ are zero, No. 19 oil passage L19 is communicated from the drain port $18b$ of the second pressure control valve $18_2$ via No. 20 oil passage L20.

Explanation has so far been made about the construction or constitution of the hydraulic oil circuit in the $D_5$ range of the manual valve 8. There will be the same kind of constitution also in the $D_3$ range. However, in the $D_3$ range, the first-speed through the third-speed transmission or speed change operation is effected by changing the speed change map to that one for $D_3$ which is stored in the electronic control circuit. If the third-speed transmission train G3 is promptly established after changing over to the $D_3$ range while running at the fifth speed, overrunning of the engine will occur. Therefore, the fourth-speed transmission train G4 is established until the vehicle speed becomes lower than a predetermined value right after the change over.

In the 2 range of the manual valve 8, No. 1 oil passage L1 is connected via the annular groove $8a$ of the manual valve 8 to No. 2 oil passage L2 and No. 17 oil passage L17 and, at the same time, to No. 21 oil passage L21 which is communicated with a left-end oil chamber $12f$ of the 4-5 shift valve 12. At the left-hand high-speed position of the main shift valve 9, No. 22 oil passage L22 which is connected to No. 3 oil passage L3 via the annular groove $9a$ of the shift valve 9, is connected to No. 9 oil passage L9 via the annular groove $8b$ of the manual valve 8. Further, at the left-hand third-speed position of the 3-4 shift valve 11, No. 23 oil passage L23 which is connected to No. 18 oil passage L18 via the annular groove $11e$ of the 3-4 shift valve 11 is connected to No. 1 oil passage L1 via an annular groove $8c$ of the manual valve 8 and a branched port portion of No. 21 oil passage L21. As a result, in the 2 range, the 4-5 shift valve 12 is restrained to the right-hand fourth-speed position by the input of the line pressure to the oil chamber $12f$ of the 4-5 shift valve 12 through No. 21 oil passage L21. Therefore, No. 8 oil passage L8 is constantly connected to No. 22 oil passage L22 through No. 9 oil passage L9. Further, the line pressure is input to No. 18 oil passage L18 from No. 23 oil passage L23 at the third-speed position of the 3-4 shift valve 11 and from No. 1 oil passage L1 at the fourth-speed position thereof. Thus, the line pressure is constantly input to the right-end oil chamber $10e$ of the 1-2 shift valve 10 through a branch of No. 18 oil passage L18, with the result that the 1-2 shift valve 10 is restrained to the left-hand second-speed position.

Right after changing over to the 2 range, when the vehicle speed V is equal to or above a predetermined high vehicle speed VH (e.g., 100 km/h), No. 1 solenoid valve $15_1$ is closed and No. 2 and No. 3 solenoid valves $15_2$, $15_3$ are opened. The main shift valve 9 is thus positioned at the left-hand high-speed position and the 3-4 shift valve 11 is positioned at the left-hand third-speed position, whereby the third-speed transmission train G3 is established. In this case, even if No. 1 solenoid valve is opened by mistake while running at the third speed, the main shift valve 9 is restrained to the high-speed position by the input of the line pressure to the differential pressure groove $9e$ of the main shift valve 9 through No. 17 oil passage L17 and No. 16 oil passage L16, whereby downshifting to the second speed or below is prevented. If No. 3 solenoid valve $15_3$ is closed by mistake while running at the third speed to cause the 3-4 shift valve 11 to be changed over to the right-hand fourth-speed position, pressurized oil is supplied from No. 8 oil passage L8 to No. 3 oil passage L3 through No. 9 oil passage L9, No. 22 oil passage L22 and the annular groove $9a$ of the main shift valve 9 which is at the high-speed position. Here, since the 1-2 shift valve 10 is being restrained to the second-speed position as described above, the second-speed transmission train G2 is established and, therefore, downshifting to the first-speed is prevented.

When the vehicle speed V is below VH and is equal to or above a predetermined low vehicle speed VL (e.g., 20 km/h), No. 1 and No. 3 solenoid valves $15_1$, $15_3$ are closed to shift the main shift valve 9 to the high-speed position and the 3-4 shift valve 11 to the fourth-speed position. The oil is supplied to the second-speed hydraulic clutch C2 through the same route as described above, thereby establishing the second-speed transmission train G2. When V<VL, No. 1 solenoid valve $15_1$ is opened to change over the main shift valve 9 to the low-speed position. The hydraulic oil is supplied from No. 2 oil passage L2 to No. 3 oil passage L3 in the same manner as in the $D_5$ range, thereby establishing the second-speed transmission train G2. The reason why the second-speed transmission train G2 is established at a relatively high vehicle speed by supplying the oil to the second-speed hydraulic clutch C2 in the route via the 3-4 shift valve 11 is as follows. Namely, if the 1-2 shift valve 10 is locked to the first-speed position by sticking or the like, the 3-4 shift valve 11 is forcibly changed over by the hydraulic pressure to the third-speed position, thereby stopping the supply of the oil to No. 3 oil passage L3, to prevent the downshifting to the first speed at a high vehicle speed. In other words, the line pressure is input to the right-end oil chamber 11f of the 3-4 shift valve 11 from No. 21 oil passage L21 through: No. 24 oil passage L24 which is connected to No. 21 oil passage L21 via an annular groove 10f of the 1-2 shift valve 10 at the right-hand first-speed position thereof; No. 25 oil passage L25 which is connected to No. 24 oil passage L24 via a notched groove 13a of the servo valve 13 at the left-hand "forward" position (i.e, illustrated position) thereof; and No. 26 oil passage L26 which is connected to No. 25 oil passage L25 via an annular groove 19a of a servo control valve 19, which will be described in more detail hereinafter, at the left-hand position to allow for forward transmission or forward travelling. In this manner, the 3-4 shift valve 11 is arranged to be forcibly shifted to the left-hand third-speed position.

The above-described combination of No. 1 through No. 3 solenoid valves $15_1$, $15_2$, $15_3$ in the 2 range can be summarized as shown in Table 2.

TABLE 2

| | $V < VL$ | $VL \leq V < VH$ | $VH \leq V$ |
|---|---|---|---|
| No. 1 solenoid valve | open | closed | closed |
| No. 2 solenoid valve | open | open | open |
| No. 3 solenoid valve | closed or open | closed | open |
| Transmission train | second speed | second speed | third speed |

In the 1 range of the manual valve 8, No. 17 oil passage L17 and No. 23 oil passage L23 are opened to the atmosphere, and the other oil passages are the same as in the 2 range.

Also in the 1 range of the manual valve 8, in order to prevent overrunning of the engine right after change over operation, No. 1 and No. 3 solenoid valves $15_1$, $15_3$ are closed and No. 2 solenoid valve $15_2$ is opened when the vehicle speed is equal to or above a predetermined vehicle speed VM (e.g., 50 km/h). In the same manner as in establishing the second-speed transmission train G2 in the high-speed range in the 2 range, the oil is supplied from No. 2 oil passage L2 to No. 3 oil passage L3 through: No. 6 oil passage L6 via the main shift valve 9 which is in the left-hand high-speed position; No. 8 oil passage L8 via the 3-4 shift valve 11 which is in the right-hand fourth-speed position; No. 9 oil passage L9 via the 4-5 shift valve 12 which is being restrained to the right-hand fourth-speed position by the line pressure from No. 21 oil passage L21; and No. 22 oil passage L22 which is connected to No. 9 oil passage L9. In this manner, the second-speed transmission train G2 is established while restraining the 1-2 shift valve 10 to the left-hand second-speed position by the line pressure to be input from No. 1 oil passage L1 through No. 18 oil passage L18. In this case, if the 1-2 shift valve 10 is locked to the first-speed position, the 3-4 shift valve 11 is changed over, like in the above-described case, to the left-hand third-speed position by the input of the line pressure through No. 26 oil passage L26. The third-speed transmission train G3 is thus established and the downshifting to the first speed is prevented.

If the vehicle speed V is below VM, No. 1 and No. 3 solenoid valves $15_1$, $15_3$ are opened and No. 2 solenoid valve $15_2$ is closed In this case, since No. 17 oil passage L17 is opened to the atmosphere in the 1 range, the line pressure is not input to the differential pressure groove 9e of the main shift valve 9. The main shift valve 9 is therefore changed over from the high-speed position to the right-hand low-speed position by the opening of No. 1 solenoid valve $15_1$. In addition, when the 3-4 shift valve 1 is changed over to the left-hand third-speed position as a result of opening of No. 1 solenoid valve $15_1$, No. 18 oil passage L18 is opened to the atmosphere through No. 23 oil passage L23 which is connected thereto, whereby the restraining of the 1-2 shift valve 10 to the second-speed position is released. Therefore, by closing No. 2 solenoid valve $15_2$ the 1-2 shift valve 10 is changed over to the right-hand first-speed position, and the first-speed transmission train G1 is established.

The above-described combination of No. 1 through No. 3 solenoid valves $15_1$, $15_2$, $15_3$ in the 1 range can be summarized as shown in Table 3.

TABLE 3

| | $V < VM$ | $VM \leq V$ |
|---|---|---|
| No. 1 solenoid valve | open | closed |
| No. 2 solenoid valve | closed | open |
| No. 3 solenoid valve | open | closed |
| Transmission train | first speed | second speed |

In the R range of the manual valve 8, the supply of the oil to No. 2 oil passage L2 is stopped, and No. 27 oil passage L27 for reverse transmission train is connected to No. 1 oil passage L1. The line pressure is input to a left-hand oil chamber 13b of the servo valve 13 via No. 28 oil passage L28 which is connected to No. 27 oil passage L27 via an annular groove 10g of the 1-2 shift valve 10 at the left-hand second-speed position thereof. As a result, the servo valve 13 is urged to the right-hand reverse transmission position, and the selector gear 6 is changed over to the right-hand reverse transmission side. At the same time, at the reverse transmission position, No. 28 oil passage L28 is connected to No. 29 oil passage L29 which is communicated with the manual valve 8 via that axial opening 13c of the servo valve 13 which is communicated with the left-hand oil chamber 13b. No. 29 oil passage L29 is connected to No. 10 oil passage L10 for the fourth-speed hydraulic clutch C4 via the annular groove 8b of the manual valve 8 in the R range thereof. The reverse transmission train GR is thus established by changing over the selector gear 6 to the reverse transmission side and by supplying oil to the fourth-speed hydraulic clutch C4.

In the R range, No. 2 solenoid valve $15_2$ is opened and the third solenoid valve $15_3$ is closed to shift the 1-2 shift valve 10 to the second-speed position and shift the 3-4 shift valve 11 to the right-hand fourth-speed position. Thus, the line pressure is input from No. 1 oil passage L1 to the oil chamber 10e of the 1-2 shift valve 10 through No. 18 oil passage L18. It is thus so arranged that, even if No. 2 solenoid valve $15_2$ is closed by mistake, the 1-2 shift valve 10 is restrained to the second-speed position so that the reverse transmission train GR can be established.

Further, when the manual valve 8 is changed over to the R range while running forward at or above a predetermined vehicle speed VI (e.g., 10 km/h), No. 2 solenoid valve $15_2$ is closed and No. 3 solenoid valve $15_3$ is opened. The 3-4 shift valve 11 is thus changed over to the left-hand third-speed position to thereby shut off the input of the line pressure to the 1-2 shift valve 10 through No. 18 oil passage L18 (No. 23 oil passage L23 is opened to the atmosphere in the R range), and the 1-2 shift valve 10 is changed over to the right-hand first-speed position to shut off the connection between No. 27 oil passage L27 and No. 28 oil passage L28, whereby the reverse transmission train GR is prevented from being established.

The above-described combination of No. 1 through No. 3 solenoid valves $15_1$, $15_2$, $15_3$ in the R range can be summarized as shown in Table 4.

TABLE 4

|  | V < VI | VI ≦ V |
|---|---|---|
| No. 1 solenoid valve | closed or open | closed or open |
| No. 2 solenoid valve | open | closed |
| No. 3 solenoid valve | closed | open |
| Transmission train | reverse | neutral |

When the manual valve 8 is changed over from the R range to $D_5$, $D_3$, 2 or 1 range, the line pressure is input from No. 2 oil passage L2 to an oil chamber 13d which is formed in the servo valve 13 opposite to the above-described oil chamber 13b, via the servo control valve 19 and No. 30 oil passage L30. The servo valve 13 is thus urged towards the left-hand forward transmission or forward travelling position to change over the selector gear 6 to the left-hand forward transmission side. Here, the servo control valve 19 is being urged by a spring 19b towards the right-hand position (i.e., illustrated position) for prohibiting forward transmission, in which position the connection between No. 2 oil passage L2 and No. 30 oil passage L30 is shut off. A right-hand oil chamber 19c of the servo control valve 19 is connected to the downstream side of an orifice 20 which is interposed in No. 2 oil passage L2, through No. 31 oil passage L31. When the oil pressure on the downstream side of the orifice 20 has been raised to a predetermined value after changing over the manual valve 8 from the R range, the servo control valve 19 is changed over to the left-hand position which allows for the forward transmission or forward travelling. It is thus so arranged that No. 30 oil passage L30 is connected to No. 2 oil passage L2 via an annular groove 19d of the servo control valve 19, thereby changing over the servo valve 13 to the forward transmission position. By this arrangement, when the servo valve 13 is changed over to the forward transmission position, the torque transmission has been effected in the direction of forward rotation by the engagement force of the first-speed hydraulic clutch C1 (second-speed hydraulic clutch C2 in the case of the 2 range), which is supplied with the oil right after the change over operation, due to the oil pressure increase on the downstream side of the orifice 20. As a result, even if the manual valve 8 is changed over from the R range to $D_5$, $D_3$, 2 or 1 range while the accelerator pedal is depressed, there occurs a condition in which the reverse rotation of the output shaft 1b is prevented by said torque transmission and, therefore, the selector gear 6 will come into a smooth engagement with the side of the fourth-speed transmission train G4, thereby preventing the wear of the gears. In the R range, the servo control valve 19 is securely changed over to the right-hand position in which the forward transmission is prohibited, by the line pressure which is input to a left-end oil chamber 19e through No. 28 oil passage L28.

If the servo control valve 19 is locked to the position in which the forward transmission is prohibited due to sticking or the like, or if the servo valve 13 is locked to the reverse transmission position even if the servo control valve 19 has been changed over to the position which allows for forward transmission, the selector gear 6 will remain in the reverse transmission position even if the manual valve 8 is changed over from the R range to the $D_5$, D, 2 or 1 range. It follows that, if the oil is supplied to the fourth-speed hydraulic clutch C4, the rear transmission train GR will be established.

Therefore, the following arrangement has been made. Namely, No. 26 oil passage L26 which is communicated with the right-hand oil chamber 11f of the 3-4 shift valve 11 is connected to No. 2 oil passage L2 at the right-hand position of the servo control valve 19, in which position the forward transmission is prohibited, via the annular groove 19a thereof; and to No. 25 oil passage L25 at the left-hand position thereof in which the forward transmission is allowed. At the reverse transmission position of the servo valve 13, No. 25 oil passage L25 is connected to the oil chamber 13d for forward transmission via a notched groove 13e of the servo valve 13. When the above-described abnormality has occurred, the line pressure is input to the oil chamber 11f of the 3-4 shift valve 11 through No. 26 oil passage L26, so that the 3-4 shift valve 11 is restrained to the left-hand third-speed position, whereby the oil is prevented from being supplied to the fourth-speed hydraulic clutch C4. In FIG. 2, numeral 13f denotes a click member for engaging the servo valve 13 to the forward transmission position and the reverse transmission position, respectively.

In the N and P ranges of the manual valve 8, the electric charging to all of the No. 1 through No. 3 solenoid valves $15_1$, $15_2$, $15_3$ is cut off to make them closed for the purpose of energy saving. However, since No. 32 oil passage L32 which is communicated with a left-end oil chamber 9f of the main shift valve 9 is connected to No. 1 oil passage L1 via the annular groove 8a of the manual valve 8, the main shift valve 9 is retained to the right-hand first-speed position. In addition, since the line pressure is input from No. 1 oil passage L1 to the oil chamber 10e of the 1-2 shift valve 10 through No. 18 oil passage L18 as a result of changing over of the 3-4 shift valve 11 to the right-hand fourth-speed position, the 1-2 shift valve 10 is maintained in the left-hand second-speed position even if No. 2 solenoid valve $15_2$ is being closed. In the P range, No. 27 oil passage L27 is connected to No. 1 oil passage L1 and the line pressure is input from No. 28 oil passage L28 to the oil chamber 13b for the reverse transmission of the servo valve 13. As a result, the servo valve 13 is changed over to and maintained in the reverse transmission position. When the vehicle speed is above VI, No. 3 solenoid valve $15_3$ is opened to change over the 3-4 shift valve 11 to the left-hand third-speed position. The input of the line pressure to the oil chamber 10e of the 1-2 shift valve 10 through No. 18 oil passage L18 is shut off to change over the shift valve 10 to the right-hand first-speed position. The interconnection between No. 27 oil passage L27 and No. 28 oil passage L28 is thus shut off.

In FIG. 2, numeral 21 denotes a relief valve which is connected to the drain side of the regulator valve 14, and numeral 22 denotes a control circuit for a lock-up clutch 3a which is incorporated into the fluid torque converter 3.

As is clear from the above description, according to one aspect of this invention, even if one of the pressure control valves becomes out of order, it is possible to introduce the output oil pressure of the other of the pressure control valves into the output side oil passage of the above-described one pressure control valve, whereby an appropriate control can be performed. According to another aspect of this invention, by defining the first pressure control valve to be the above-described one pressure control valve in which the fail-safe function is obtained, it is possible to avoid the slippage in the hydraulic engaging elements. In addition, according to a third or fourth aspect of this invention, when both pressure control valves are in good order, it is possible to prevent the output oil pressure of one of the pressure control valves from going out of order by the output oil pressure of the other of the pressure control valves.

It is readily apparent that the above-described apparatus for controlling an oil pressure for a vehicular automatic transmission has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for controlling an oil pressure for a vehicular automatic transmission, said apparatus comprising:

an accumulator connected to an oil passage which is in communication with each of hydraulic engaging elements for power transmission or speed changing;

a regulator valve for regulating an oil pressure to be supplied to said hydraulic engaging elements;

a first pressure control valve of electromagnetic type for controlling an output oil pressure of said regulator valve by causing an oil pressure to act thereupon;

a second pressure control valve of electromagnetic type for controlling a back pressure of said accumulator;

wherein a drain port of one of said first and second pressure control valves is connected to an oil passage on an output side of the other of said pressure control valves.

2. An apparatus for controlling an oil pressure for a vehicular automatic transmission according to claim 1, wherein said one of said pressure control valves is said first pressure control valve and other of said pressure control valves is the second pressure control valve.

3. An apparatus for controlling an oil pressure for a vehicular automatic transmission according to claim 1, wherein an output oil pressure of said other of said pressure control valves is controlled to a pressure which is equal to or below an output oil pressure of said one of said pressure control valves.

4. An apparatus for controlling an oil pressure for a vehicular automatic transmission according to claim 2, wherein an output oil pressure of said second pressure control valve is controlled to a pressure which is equal to or below an output oil pressure of said first pressure control valve.

* * * * *

UNITED STATES PATENT AND TRADEMARK OFFICE
CERTIFICATE OF CORRECTION

PATENT NO.:     5,205,192
DATED     :     April 27, 1993
INVENTOR(S):    Tatsuyuki OHASHI and Tetsuya MOCHIZUKI It is certified that error appears in the above-identified patent and that said Letters Patent is hereby corrected as shown below:

On the cover page, Item [75] after "Tatsuyuki Ohashi," the address should be changed from "Minami-Kawachimamachi" to --Minami-Kawachimachi--;

Column 14,   line 20, delete "said" (first occurrence); and
             line 21, after "and" insert --the--.

Signed and Sealed this

Sixteenth Day of July, 1996

Attest:

BRUCE LEHMAN

Attesting Officer         Commissioner of Patents and Trademarks